United States Patent
Zhang et al.

(10) Patent No.: US 12,320,541 B2
(45) Date of Patent: Jun. 3, 2025

(54) APPARATUS, SYSTEM AND METHOD FOR CONTROLLING AIRFLOW

(71) Applicant: KONINKLIJKE PHILIPS N.V., Eindhoven (NL)

(72) Inventors: Qiushi Zhang, Eindhoven (NL); Wei Gu, Eindhoven (NL); Weizhong Chen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 311 days.

(21) Appl. No.: 17/789,469

(22) PCT Filed: Dec. 18, 2020

(86) PCT No.: PCT/EP2020/086961
§ 371 (c)(1),
(2) Date: Jun. 27, 2022

(87) PCT Pub. No.: WO2021/130109
PCT Pub. Date: Jul. 1, 2021

(65) Prior Publication Data
US 2023/0069422 A1    Mar. 2, 2023

(30) Foreign Application Priority Data

Dec. 26, 2019  (WO) ................ PCT/CN2019/128688
Jan. 23, 2020  (EP) .................................. 20153412

(51) Int. Cl.
*F24F 11/79*    (2018.01)
*F24F 13/14*    (2006.01)

(52) U.S. Cl.
CPC .......... *F24F 11/79* (2018.01); *F24F 13/1413* (2013.01)

(58) Field of Classification Search
CPC ....... F24F 11/79; F24F 13/1413; F24F 13/081
(Continued)

(56) References Cited

U.S. PATENT DOCUMENTS

| 4,677,904 A | * | 7/1987 | Natsumeda | ............... F15D 1/08 |
| | | | | 454/319 |
| 2004/0152412 A1 | | 8/2004 | Gehring et al. | |

(Continued)

FOREIGN PATENT DOCUMENTS

| CN | 104047908 A | 9/2014 |
| CN | 107429924 A | 12/2017 |

(Continued)

OTHER PUBLICATIONS

Extended European Search Report issued in connection with corresponding EP Application No. 20153412.0 dated Jul. 23, 2020.
(Continued)

*Primary Examiner* — Avinash A Savani
*Assistant Examiner* — Ryan L Faulkner
(74) *Attorney, Agent, or Firm* — Maschoff Brennan (57) ABSTRACT

An apparatus, system and method for controlling airflow is described. The apparatus comprises a wall which delimits a flared bore. The apparatus further comprises at least one air guide member which retractably protrudes into the flared bore from the wall. The flared bore widens to an outlet, thereby to permit a diverging airflow to be expelled therefrom when each of the at least one air guide member is retracted. When the at least one air guide member protrudes into the flared bore, air flowing in the flared bore is guided by a surface, e.g. a concave surface, of the respective air guide member away from the wall and towards the outlet. The retractable air guide member thus enables the direction and/or degree of convergence of the air flowing out of the outlet to be controlled.

16 Claims, 6 Drawing Sheets

(58) Field of Classification Search
USPC .................................................. 454/333, 302
See application file for complete search history.

(56) References Cited

U.S. PATENT DOCUMENTS

| | | | |
|---|---|---|---|
| 2005/0130578 A1 | 6/2005 | Butera et al. | |
| 2008/0108291 A1 | 5/2008 | Biasiotto et al. | |
| 2010/0011799 A1* | 1/2010 | Sakakibara | B60H 1/3414 165/104.34 |
| 2010/0261422 A1* | 10/2010 | Sakakibara | F24F 13/10 454/155 |
| 2010/0304655 A1* | 12/2010 | Nagasaka | B60H 1/3421 454/152 |
| 2019/0047374 A1* | 2/2019 | Schaal | F24F 13/072 |
| 2019/0315200 A1 | 10/2019 | Pestke | |

FOREIGN PATENT DOCUMENTS

| | | |
|---|---|---|
| DE | 102008008586 A1 | 8/2009 |
| EP | 1544007 A1 | 6/2005 |
| EP | 1920955 A1 | 5/2008 |
| EP | 2090449 A2 | 8/2009 |
| EP | 2149465 A1 | 2/2010 |
| EP | 3017977 A1 | 5/2016 |
| EP | 3213946 A1 | 9/2017 |
| EP | 3842701 A1 | 6/2021 |
| FR | 3031474 A1 | 7/2016 |
| JP | 2016-088188 A | 5/2016 |
| JP | 2016-090096 A | 5/2016 |
| WO | 2016/113480 A1 | 7/2016 |
| WO | 2021/130109 A1 | 7/2021 |

OTHER PUBLICATIONS

International Search Report and Written Opinion issued in connection with corresponding PCT Application No. PCT/EP2020/086961 dated Mar. 12, 2021.

* cited by examiner

APPARATUS, SYSTEM AND METHOD FOR CONTROLLING AIRFLOW

CROSS-REFERENCE TO RELATED APPLICATIONS

The present application is a U.S. National Phase application under 35 U.S.C. § 371 of International Application No. PCT/EP2020/086961, filed on Dec. 18, 2020, which claims the benefit of European Patent Application No. 20153412.0, filed on Jan. 23, 2020, and International Application No. PCT/CN2019/128688, filed on Dec. 26, 2019. This application is hereby incorporated by reference herein.

FIELD OF THE INVENTION

This invention relates to an airflow apparatus, a system comprising the airflow apparatus, and a method of operating the airflow apparatus.

BACKGROUND OF THE INVENTION

It is often desirable for air delivery appliances, such as cooling fans, air purifiers, air humidifiers, air conditioners, and the like, to provide an adjustable or dynamic airflow. For example, conventional cooling fans may swivel on a base in order to direct airflow in different directions. Motorized control over the swiveling of the cooling fan may also permit the airflow to be swept across a range of different directions.

A disadvantage of such conventional air delivery appliances relates to the space required in order to enable adjustment of the airflow. In the example of a cooling fan, swiveling the cooling fan may require that sufficient space is provided around the cooling fan in order to accommodate its movement.

Conventional air conditioning appliances may, for example, comprise adjustable grilles. The grilles may be adjusted according to the desired airflow direction or may be controlled to direct the airflow across a range of directions. Such grille designs may, however, also mean that compactness of the appliance is compromised, with limitations being placed on the design flexibility of the appliance as a whole.

SUMMARY OF THE INVENTION

The invention is defined by the claims.

According to an aspect there is provided an airflow apparatus comprising: an outlet for allowing air to flow out of the apparatus; a wall delimiting a flared bore which widens to the outlet; and at least one air guide member configured to retractably protrude into the flared bore from the wall, the at least one air guide member having a surface for guiding air flowing in the flared bore away from the wall and towards the outlet when the air guide member is protruding into the flared bore.

The present invention is based on the realization that the direction and/or convergence of air flowing out of the outlet of an airflow apparatus may be controlled by the apparatus including a wall defining a flared bore which widens to the outlet, and at least one air guide member which retractably protrudes into the flared bore. When the at least one air guide member is retracted out of the flared bore, a relatively diffuse airflow out of the outlet may result whose divergence is defined by the widening of the flared bore towards the outlet. When the at least one air guide member is protruding into the flared bore, the surface of the air guide member may guide the air flowing close to the wall away from the wall, but still towards the outlet. The at least one air guide member may thus assist to control the direction of and/or converge the airflow, relative to when the at least one air guide member is retracted. Such adjustment is enabled without, for example, changing the position of the flared bore/outlet, which may enable the airflow apparatus to have a compact and flexible design.

The wall may comprise a curved surface whose curvature in the direction of the outlet defines the flared bore. The airflow may follow the curved surface of the wall and thus form, when the at least one air guide member is retracted, a diverged flow pattern from the outlet. The airflow adhering to the curved surface of the wall in this manner is a phenomenon known as the Coandă effect. The protrusion of the air guide members into the flared bore effectively interrupts the airflow following the curved surface of the wall, thereby to enable control over the direction and/or degree of convergence of the airflow leaving the outlet.

The surface of the at least one air guide member may, for example, comprise a concave surface. The concave surface may advantageously define, together with the surface of the flared bore, a substantially continuous, e.g. streamlined, air guiding surface when the respective air guide member is protruding into the flared bore. This may result in more efficient operation of the apparatus, with less noise and turbulence being generated when the air guide member is protruded, e.g. relative to an air guide member having a non-curved surface for guiding the airflow.

In an embodiment, the at least one air guide member is retractable through a slot in the wall. The slot may, for example, enable complete retraction of the at least one air guide member out of the flared bore. The air guide member(s) may not interfere with airflow through the flared bore when completely retracted into the respective slot(s).

Each of the at least one air guide member may be curved so as to define an arch against an outer surface of the wall when retracted. This may assist in making the design compact.

The retraction and/or protrusion of the air guide member may be realized using any suitable mechanism. The mechanism may be manual and/or electrically operated. An electrically operated retraction mechanism may, for example, enable the air guide member to be retracted and/or protruded via control signals sent by a controller.

More generally, the airflow apparatus may comprise a plurality of air guide members, and each of the plurality of air guide members may be retractable independently of the other air guide member or members. The capability to protrude and retract each air guide member independently of the other(s) may enhance the airflow control which can be provided by the apparatus. In other examples, at least some of the air guide members may be retracted and protruded together, which may permit the retraction mechanism to be simplified.

In a non-limiting example, the electrically operated mechanism may be configured to provide linear motion, e.g. using a rack-and-pinion and linear motor. In such an example, a controller may send a signal defining the rotation direction of the pinion or the movement direction of the linear motor in order to realize bidirectional motion of the respective air guide member.

An extremity of each of the at least one air guide member, when protruding into the flared bore, may meet an axis extending between opposing portions of the wall at a distance along the axis from the wall which is less than one third of a width of the flared bore between the opposing portions. The extent of protrusion of the air guide member into the flared bore may thus be restricted in order to assist the air guide member to direct the airflow towards the outlet, rather than towards the wall, when protruding into the flared bore.

The airflow apparatus may comprise an air displacement device configured to provide a flow of air into the flared bore and out of the outlet. The air displacement device may, for example, comprise a fan. The airflow apparatus may, for example, be included in an air purifier; purified air being expelled from the outlet.

According to another aspect there is provided a method for operating an airflow apparatus, the airflow apparatus including: an outlet for allowing air to flow out of the apparatus; a wall delimiting a flared bore which widens to the outlet; and at least one air guide member configured to retractably protrude into the flared bore from the wall, the at least one air guide member having a surface, the method comprising: protruding the at least one air guide member into the flared bore, such that air flowing in the flared bore is guided by the surface away from the wall and towards the outlet.

In an embodiment, the method further comprises retracting the at least one air guide member from the flared bore. The protruding and/or the retracting may, for instance, be implemented in a sequence, thereby providing a dynamic airflow from the outlet.

The at least one air guide member may comprise a series of air guide members which are respectively arranged to protrude into the flared bore from positions along the wall which are successively closer to the outlet. The series of air guide members may enable further control over the degree of convergence of the airflow from the outlet. When, for example, a greater degree of convergence is desired, an air guide member of the series positioned further away from the outlet may be protruded into the flared bore. When a lesser degree of convergence is desired, an air guide member of the series positioned closer to the outlet may instead be protruded into the flared bore.

In an embodiment, the method comprises selecting at least one of the air guide members of the series based on a desired direction and/or degree of convergence of airflow from the outlet. The protruding may comprise protruding the selected at least one of the respective air guide members of the series into the flared bore.

The at least one air guide member may alternatively or additionally comprise a pair of air guide members which are respectively arranged to protrude into the flared bore from opposing parts of the wall.

The pair of air guide members may enable further control over the direction of the airflow from the outlet. When, for example, only one of the pair of air guide members is protruded into the flared bore, the airflow may be guided away from the air guide member towards a distal area of the outlet (relative to the position of the single air guide member). On the other hand, when both air guide members of the pair are protruded into the flared bore, their combined air guiding effect may result in a converged airflow emerging from a central area of the outlet.

In an embodiment, the method comprises selecting one or both of the air guide members of the pair based on a desired direction and/or degree of convergence of airflow from the outlet. The protruding may comprise protruding the selected one or both air guide members of the pair of air guide members into the flared bore.

The airflow from the outlet may, for example, be tuned by combining selection of the at least one of the air guide members of the series with selection of one or both of the air guide members of the pair.

According to yet another aspect there is provided a system comprising: the apparatus as defined above; and a controller configured to control the protrusion and/or retraction of the at least one air guide member.

The controller may, for example, be configured to control the protrusion and/or retraction of the at least one air guide member in a sequence and/or loop, thereby to provide a dynamic airflow from the outlet.

Alternatively or additionally, the controller may be configured to receive an indication relating to a desired direction and/or degree of convergence of airflow from the outlet, and control the protrusion and/or retraction of the at least one air guide member based on the indication.

The system may, for instance, comprise a user interface for permitting user input of the indication. The controller may be configured to receive the indication from the user interface, and control the protrusion and/or retraction of the at least one air guide member accordingly.

When the at least one air guide member comprises the series of air guide members described above, the controller may be configured to: select at least one of the air guide members of the series based on the received indication; and control the at least one air guide member such that the selected at least one of the respective air guide members of the series is protruded into the flared bore.

Alternatively or additionally, when the at least one air guide member comprises the pair of air guide members described above, the controller may be configured to: select one or both of the air guide members from the pair of air guide members based on the received indication; and control the at least one air guide member such that the selected one or both of the air guide members of the pair of air guide members is or are protruded into the flared bore.

According to a further aspect there is provided an air delivery appliance comprising the apparatus or the system defined above. The air delivery appliance may, for example, be a household or commercial appliance. The airflow apparatus may receive a flow of air in the flared bore, and control the direction and/or convergence of the air being expelled from the outlet, which may also define an outlet of the air delivery appliance.

The air delivery appliance may be, for instance, a cooling fan, an air purifier, such as a fresh air purification unit, an air humidifier, and/or an air conditioner.

BRIEF DESCRIPTION OF THE DRAWINGS

Examples of the invention will now be described in detail with reference to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

Provided is an airflow apparatus for controlling the direction and/or degree of convergence of air flowing from an outlet. The apparatus comprises a wall which delimits a flared bore. The apparatus further comprises at least one air guide member which retractably protrudes into the flared bore from the wall. The flared bore widens to the outlet, thereby to permit a diverging airflow to be expelled therefrom when each of the at least one air guide member is retracted. When the at least one air guide member protrudes into the flared bore, air flowing in the flared bore is guided by a surface, e.g. a concave surface, of the respective air guide member away from the wall and towards the outlet. The retractable air guide member thus enables the direction and/or degree of convergence of the air flowing out of the outlet to be controlled. Further provided is a system comprising the apparatus and a controller for controlling the protrusion/retraction of the at least one air guide member. A method of operating the airflow apparatus is also disclosed.

The present invention is based on the realization that the direction and/or convergence of air flowing out of the outlet of an airflow apparatus may be controlled by the apparatus including a wall defining a flared bore which widens to the outlet, and at least one air guide member which retractably protrudes into the flared bore. When the at least one air guide member is retracted out of the flared bore, a relatively diffuse airflow out of the outlet may result whose divergence is defined by the widening of the flared bore towards the outlet. When the at least one air guide member is protruding into the flared bore, the surface of the air guide member may guide the air flowing close to the wall away from the wall, but still towards the outlet. The at least one air guide member may thus assist to control the direction of and/or converge the airflow, relative to when the at least one air guide member is retracted. Such adjustment is enabled without, for example, changing the position of the flared bore/outlet, which may enable the airflow apparatus to have a compact and flexible design.

This flared bore of the airflow apparatus may be a stationary structure which is nevertheless capable of generating dynamic airflow patterns via the retractable air guide member(s). By controlling the protrusion/extension of the air guide member(s), the airflow apparatus may generate various airflow patterns, including focused, dispersed, tilted, oscillating, or any combination of these, as will be described in greater detail herein below.

Extending the air guide member(s) into the flared channel may, at least in some examples, be regarded as enabling control over airflow patterns via selectively activating or deactivating the Coandă effect over a defined section of the surface of the wall which delimits the flared bore. This design may, in some examples, lead to improved compactness, reduced structural complexity and lower cost, lower noise generation, and improved mechanical reliability relative to conventional air delivery appliances.

Figure 1:
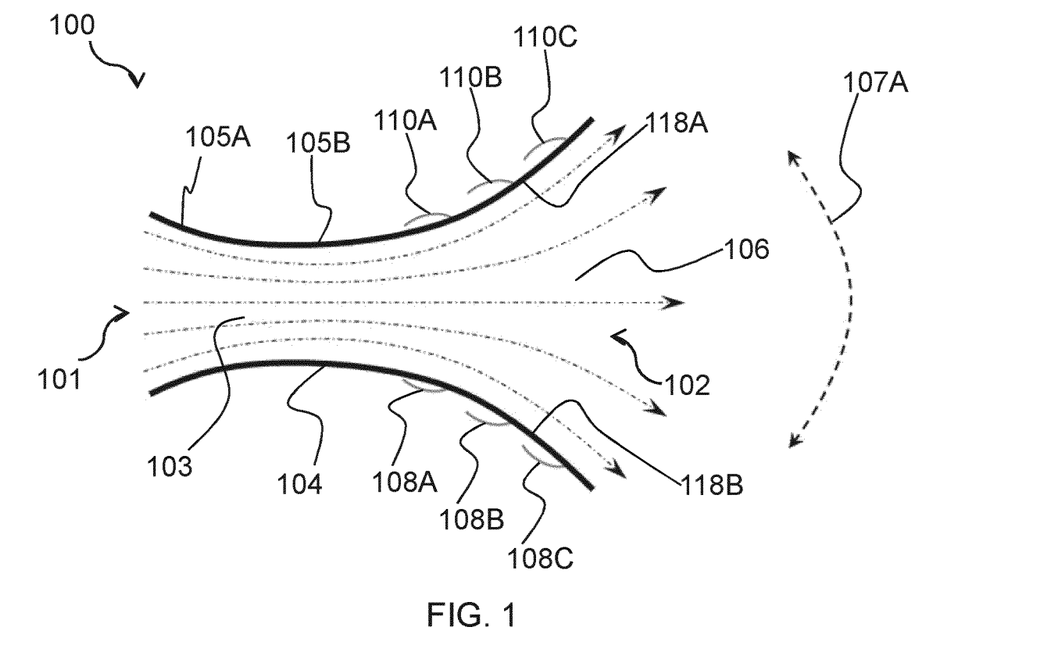
FIG. 1 schematically depicts a cross-section of an apparatus according to an example in which all of the air guide members are retracted.

FIG. 1 schematically depicts a cross-section of an apparatus 100 according to a non-limiting example. The apparatus 100 receives an airflow via an inlet 101. The airflow may be generated, for example, by an air displacement device (not shown in FIG. 1).

In an embodiment, the air displacement device is included in the airflow apparatus 100. Alternatively or additionally, the air displacement device may be included in an air delivery appliance from which the airflow is received by the apparatus 100 via the inlet 101. In either case, the airflow apparatus 100 may be employed to control the direction and/or convergence of the airflow passing out of the apparatus 100 via the outlet 102.

Any suitable air displacement device may be used to generate the airflow. The air displacement device may, for instance, comprise a fan whose rotating fan blades displace air in order to generate the airflow. The airflow may, for example, be passed through air treatment components, e.g. one or more filters, a humidifier, a cooling unit, etc., prior to reaching the inlet 101 of the apparatus 100.

More generally, when the airflow apparatus 100 is included in an air delivery appliance, the outlet 102 of the apparatus 100 may also define the outlet of the air delivery appliance. The air delivery appliance may be, for instance, a cooling fan, an air purifier, such as a fresh air purification unit, an air humidifier, and/or an air conditioner. When, for example, the airflow apparatus 100 is included in, or used in conjunction with, an air purifier, the purified air may be expelled from the outlet 102.

The airflow apparatus 100 comprises, as shown in FIG. 1, a bore 103 delimited by a wall 104. The air flows through the bore 103 to the outlet 102, as represented by the arrows in FIG. 1. The inner surface of the wall 104 may be curved, such that the airflow adheres to the wall 104 as it passes through the bore 103. The airflow adhering to the curved surface of the wall 104 in this manner is a phenomenon known as the Coandă effect.

In the non-limiting example shown in FIG. 1, the bore 103 smoothly narrows from a first wall region 105A to a second wall region 105B, before smoothly widening to the outlet 102. The widening of the bore 103 from the second wall region 105B to the outlet 102 corresponds to the flared bore 106. The curvature of the surface of the wall 104 shown in FIG. 1 may assist to provide a diverged airflow from the outlet 102, as represented by the hashed arrows emerging from the outlet 102.

More generally, by the wall 104 defining the flared bore 106 which widens to the outlet 102, a relatively diffuse airflow out of the outlet 102 may result whose divergence is defined by the widening of the flared bore 106 towards the outlet 102. The diverging airflow pattern is represented in FIG. 1 by the double-headed hashed arrow 107A.

The airflow apparatus 100 comprises at least one air guide member 108, 110 which retractably protrudes into the flared bore 106. In the configuration shown in FIG. 1, each of the at least one air guide member 108, 110 is retracted. When retracted out of the flared bore 106, the air guide member(s) 108, 110 may not, or only negligibly, interrupt the airflow in the flared bore 106, such that the diverging airflow pattern 107A may be solely, or primarily, determined by the flared bore 106.

The at least one air guide member 108, 110 may be retractable from and protrudable into the flared bore 106 in any suitable manner. In a non-limiting example, the at least one air guide member 108, 110 is retractable through a slot (not visible) in the wall 104. The slot may, for example, enable complete retraction of the at least one air guide member 108, 110 out of the flared bore 106. In such an example, the completely retracted air guide member(s) 108, 110 may not, or only negligibly, interfere with airflow through the flared bore 106.

In an embodiment, the airflow apparatus 100 comprises a plurality of air guide members 108, 110, and each of the plurality of air guide members 108, 110 is retractable, e.g. via a respective slot, independently of the other air guide member or members 108, 110. The capability to protrude and retract each air guide member 108, 110 independently of the other(s) may enhance the airflow control which can be provided by the apparatus 100. In other examples, at least some of the air guide members 108, 110 may be retracted and protruded together, which may permit the retraction mechanism to be simplified.

The retraction and/or protrusion of the air guide member(s) 108, 110 may be realized using any suitable mechanism. The mechanism may be manual and/or electrically operated. In a relatively simple example, each of the at least one air guide member 108, 110 may be protruded into the flared bore 106 and retracted therefrom by the user manually operating a lever or handle. An electrically operated retraction mechanism may, for example, enable the air guide member(s) 108, 110 to be retracted and/or protruded via control signals sent by a controller, as will be described in greater detail herein below with reference to FIG. 10.

In a non-limiting example, when the apparatus 100 comprises an electrically operated mechanism for protruding and/or retracting the air guide members 108, 110, the mechanism may be configured to provide linear motion, e.g. via a rack-and-pinion and linear motor.

As shown in FIG. 1, each of the at least one air guide member 108, 110 is curved so as to define an arch against an outer surface of the wall 104 when retracted. This may assist in making the design compact because the air guide member(s) may be disposed close to the wall 104 when retracted.

Figure 2:
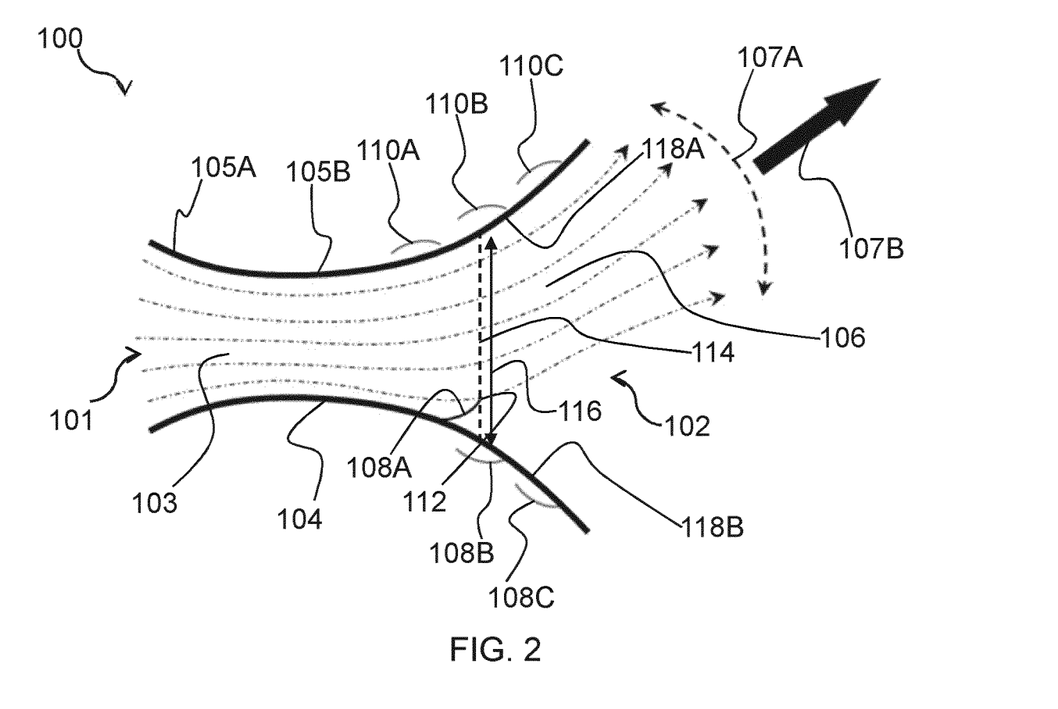
FIG. 2 schematically depicts the apparatus shown in FIG. 1, in which one of the air guide members is protruding into the flared bore of the apparatus.

FIG. 2 schematically depicts the apparatus 100 shown in FIG. 1, but with an air guide member 108A protruding into the flared bore 106. As represented by the hashed arrows in FIG. 2, a surface of the air guide member 108A guides the air flowing close to the wall 104 away from the wall 104, but still towards the outlet 102. The air guide member 108, 110 may, for example, be regarded as deactivating the Coandă effect provided by the flared bore 106.

The predominant direction of the airflow, as represented by the arrow 107B, may be determined by the protrusion of the air guide member 108A into the flared bore 106. A more converged airflow pattern 107A is also evident in FIG. 2, as compared to the airflow pattern 107A in FIG. 1 when no air flow member 108, 110 is protruded into the flared bore 106.

The surface of the air guide member 108, 110 which guides the airflow, when the respective air guide member 108, 110 is protruded into the flared bore 106, may have any suitable shape, provided that the air guide member 108, 110 is able to guide the air flowing close to the wall 104 away from the wall 104, and towards the outlet 102.

In a preferred embodiment, the surface of the at least one air guide member 108, 110 comprises a concave surface. As shown for the non-limiting example depicted in FIG. 2, the concave surface of the protruding air guide member 108A may define, together with the surface of the flared bore 106, a substantially continuous, e.g. streamlined, air guiding surface. This may result in more efficient operation of the apparatus 100, with less noise and turbulence being generated when the air guide member 108A is protruded, e.g. relative to an air guide member 108, 110 having a non-curved surface for guiding the airflow.

As shown in FIG. 2, an extremity 112 of each of the at least one air guide member 108, 110, when protruding into the flared bore 106, may meet an axis 114 extending between opposing portions of the wall 104 at a distance along the axis 114 from the wall 104 which is less than one third of a width 116 of the flared bore 106 between the opposing portions. The extent of protrusion of the air guide member(s) 108, 110 into the flared bore 106 may thus be restricted in order to assist the protruding air guide member 108, 110 to direct the airflow towards the outlet 102, rather than towards the wall 104.

The air guide members 108, 110 may, for example, all have substantially the same dimensions, e.g. length and curvature, and may thus all protrude by the same distance from the wall 104. In other examples, the air guide members 108, 110 may have different dimensions relative to each other.

Whilst not shown in the Figures, the degree or extent of protrusion/retraction of the at least one air guide member 108, 110 may in some examples be controlled, e.g. via an electrically operated retraction mechanism, in order to control the characteristics of the airflow emerging from the outlet 102 of the airflow apparatus 100.

In an embodiment, the at least one air guide member 108, 110 comprises a series of air guide members 108A, 108B, 108C which are respectively arranged to protrude into the flared bore 106 from positions along the wall 104 which are successively closer to the outlet 102. The series of air guide members 108A, 108B, 108C may enable further control over the degree of convergence of the airflow from the outlet 102, as shown in FIGS. 2-4.

In FIG. 2, the air guide member 108A which is furthest from the outlet 102 is protruded into the flared bore 106, while the other air guide members 108B, 108C are retracted. In FIG. 4, the air guide member 108C which is closest to the outlet 102 is protruded into the flared bore 106, while the other air guide members 108A, 108B are retracted. Due to the widening of the flared bore 106, and also owing to the air guide members 108A, 108C protruding from the wall 104 to substantially the same degree, the airflow pattern 107A shown in FIG. 2 is more converged than that shown in FIG. 4.

Figure 3:
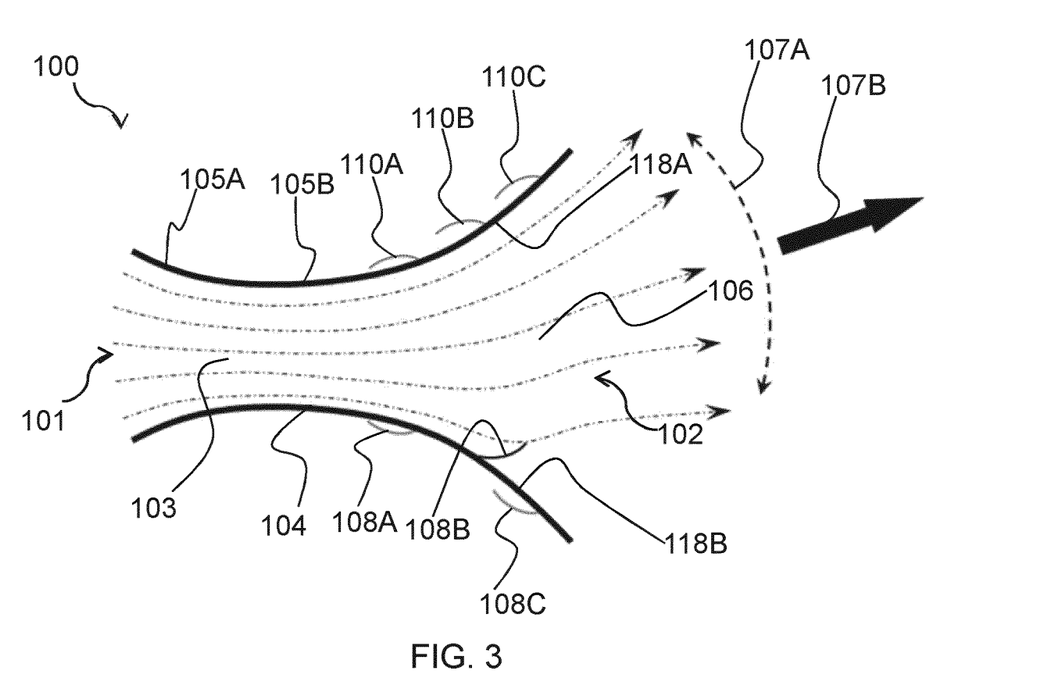
FIG. 3 schematically depicts the apparatus shown in FIG. 2, in which a different air guide member is protruding into the flared bore.
Figure 4:
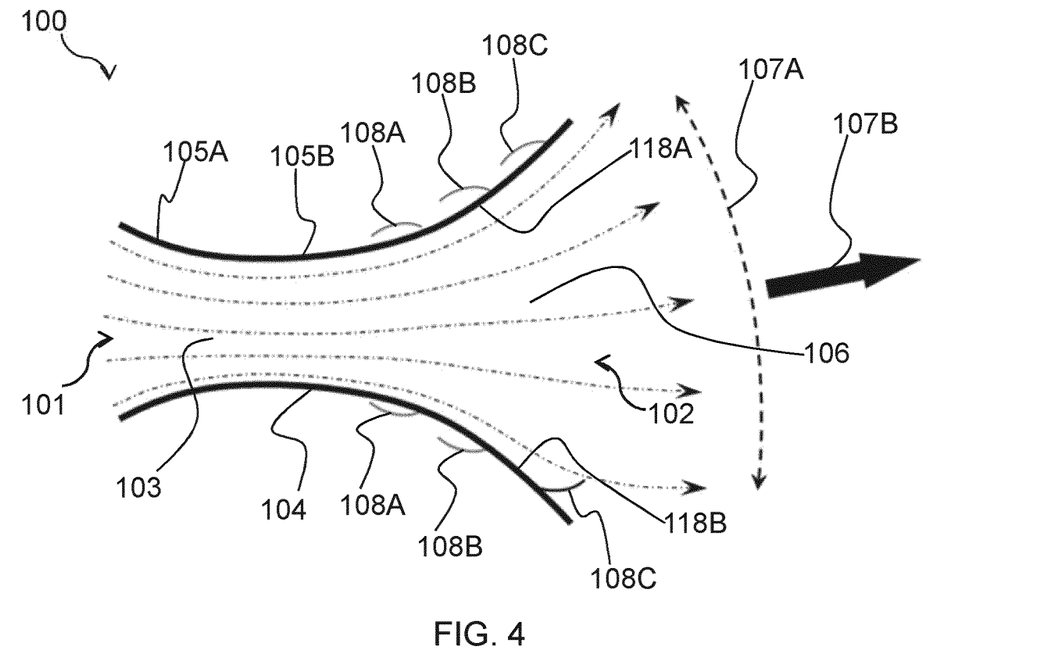
FIG. 4 schematically depicts the apparatus shown in FIGS. 2 and 3, in which a different air guide member is protruding into the flared bore.

In FIG. 3, the only protruded air guide member 108B is between the air guide members 108A, 108C which are respectively protruded in FIGS. 1 and 4. An intermediate degree of convergence of the airflow pattern 107A is therefore shown in FIG. 3 relative to the more converged and less converged air flow patterns 107A of the configurations shown in FIGS. 2 and 4 respectively.

By protruding different air guide members 108, 110 of the series into the flared bore 106, the predominant direction 107B of the airflow may also be tuned. As shown in FIGS. 2-4, the degree of tilting of the airflow direction 107B relative to a central axis of the flared bore 106 may decrease with proximity of the air guide member 108, 110 of the series towards the outlet 102. The configurations shown in FIGS. 2-4 may thus be regarded as demonstrating the capability of the airflow apparatus 100 to provide tilted airflows with different degrees of asymmetry and divergence.

More generally, when the apparatus 100 comprises the series of air guide members 108A, 108B, 108C which protrude into the flared bore 106 from positions along the wall 104 which are successively closer to the outlet 102, selectively protruding respective air guide member(s) of the series may permit enhanced control over the direction and/or degree of convergence of the airflow emerging from the outlet 102.

Alternatively or additionally, the at least one air guide member 108, 110 comprises at least one pair of air guide members 108A, 110A; 108B, 110B; 108C, 110C. The air guide members 108, 110 of the pair are respectively arranged to protrude into the flared bore 106 from opposing parts 118A, 118B of the wall 104.

When, for example, only one of the pair of air guide members 108, 110 is protruded into the flared bore 106, the airflow may be guided away from the protruding air guide member 108, 110 towards a distal area of the outlet 102 (relative to the position of the single air guide member 108, 110), as shown in FIGS. 2-4. On the other hand, when both air guide members 108, 110 of the pair are protruded into the flared bore 106, their combined air guiding effect may result in a converged symmetric airflow emerging from the outlet 102.

Figure 5:
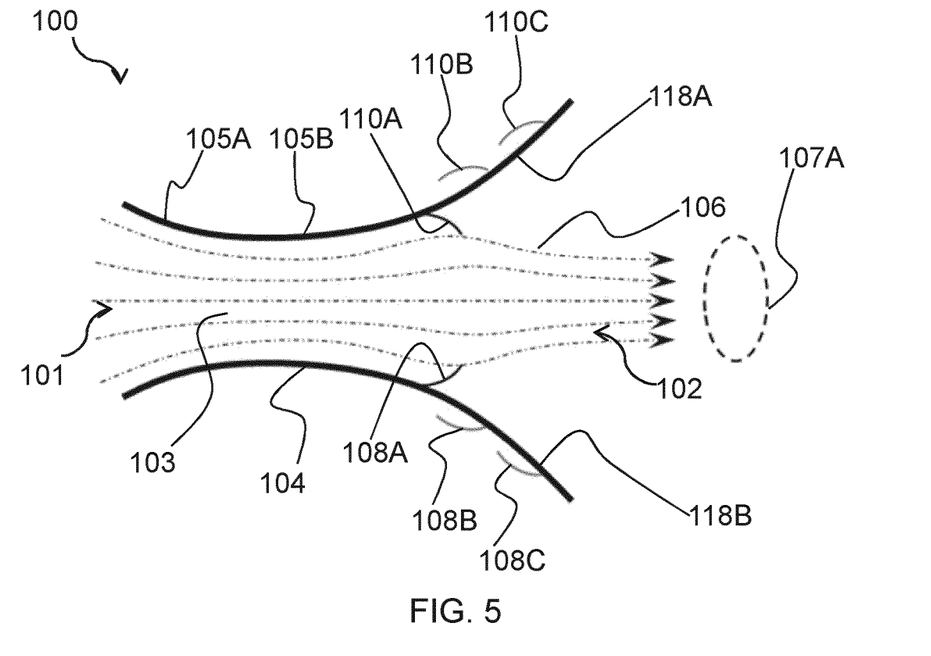
FIG. 5 schematically depicts the apparatus shown in FIG. 1, in which both air guide members of an opposing pair are protruding into the flared bore.

FIG. 5 schematically depicts the airflow apparatus 100 shown in FIG. 1, but in a configuration in which both air guide members 108A, 110A of an opposing pair are protruding into the flared bore 106. The resulting airflow pattern 107A is converged relative to, for example, the airflow pattern 107A shown in FIG. 1.

In the example shown in FIG. 5, the air flowing along the wall part 118A is guided away from the wall 104 by the air guide member 110A to a similar degree as the air flowing along the opposing wall part 118B by the opposing air guide member 108A. This may result in the converged airflow from the outlet 102 being symmetrical about the central axis of the flared bore 106. This contrasts with the configurations shown in FIGS. 2-4, in which the predominant direction of the airflow 107B is angled or tilted to varying degrees relative to the central axis of the flared bore 106.

Accordingly, the retractable air guide member(s) 108, 110 may assist to control the convergence of the airflow, as shown in FIG. 5, or both the convergence and the predominant direction 107B of the airflow, as shown in FIGS. 2-4, relative to the airflow pattern 107A provided by the configuration shown in FIG. 1.

Figure 6:
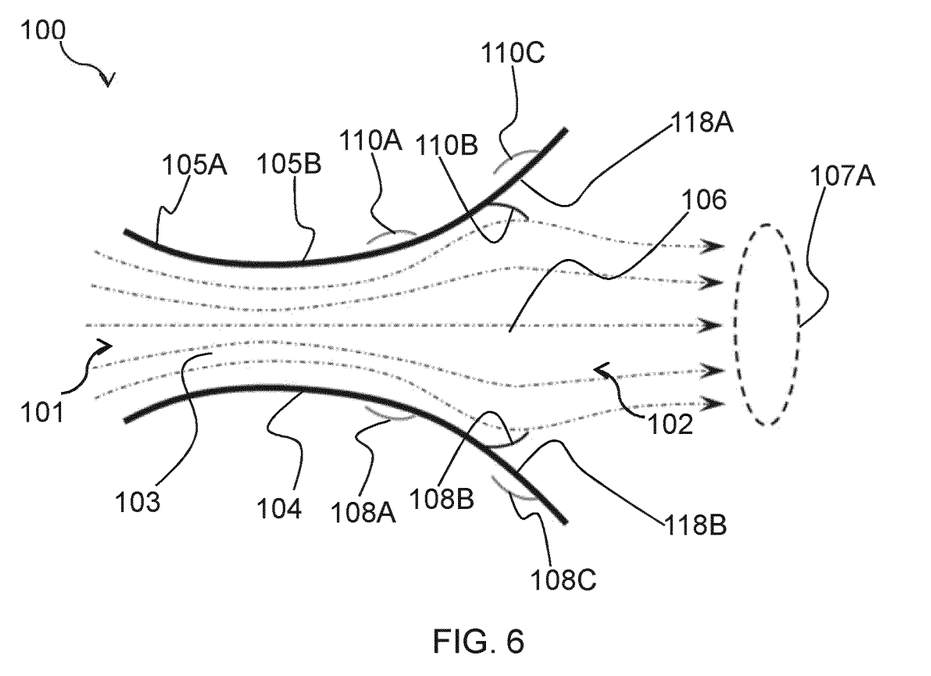
FIG. 6 schematically depicts the apparatus shown in FIG. 5, in which both air guide members of a different opposing pair are protruding into the flared bore.

FIG. 6 schematically depicts an exemplary configuration in which both air guide members 108B, 110B of a different pair (from the protruding pair 108A, 110A of FIG. 5) protrude into the flared bore 106. Similarly to the configuration of FIG. 5, the resulting airflow pattern 107A in FIG. 6 is converged relative to the airflow pattern 107A shown in FIG. 1. However, the airflow pattern 107A shown in FIG. 6 is less converged relative to that of the configuration of FIG. 5 because the air guide members 108B, 110B are positioned closer to the outlet 102 along the wall 104 of the flared bore 106 than the air guide members 108A, 110A (and protrude from the wall 104 to a similar, or the same, degree).

Figure 7:
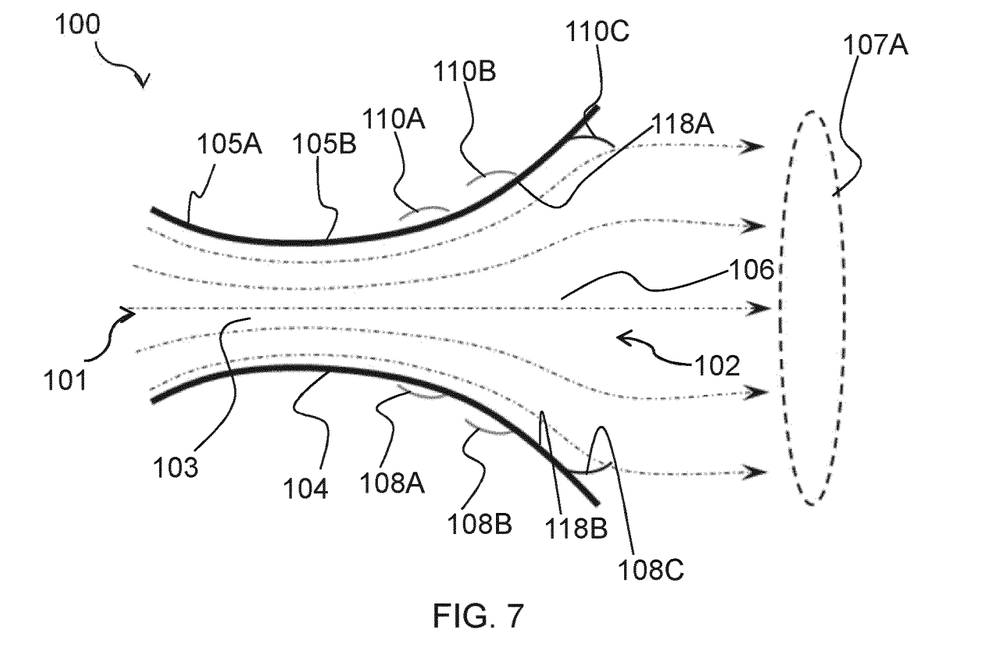
FIG. 7 schematically depicts the apparatus shown in FIGS. 5 and 6, in which both air guide members of a different opposing pair are protruding into the flared bore.

The exemplary configuration depicted in FIG. 7 provides a less converged airflow pattern 107A than that shown in FIG. 6 due to the protruding pair of air guide members 108C, 110C being positioned closer to the outlet 102 along the wall 104 of the flared bore 106 than the air guide members 108B, 110B (and protrude from the wall 104 to a similar, or the same, degree).

Accordingly, a plurality of pairs of retractable air guide member 108A, 110A; 108B, 110B; 108C, 110C, which pairs are positioned successively closer to the outlet 102, may assist in controlling the convergence of the airflow from the outlet 102.

The airflow from the outlet 102 may, for example, be tuned by combining selection of one of the air guide members 108, 110 of the series with selection of one or both of the air guide members 108, 110 of the opposing pair.

Figure 8:
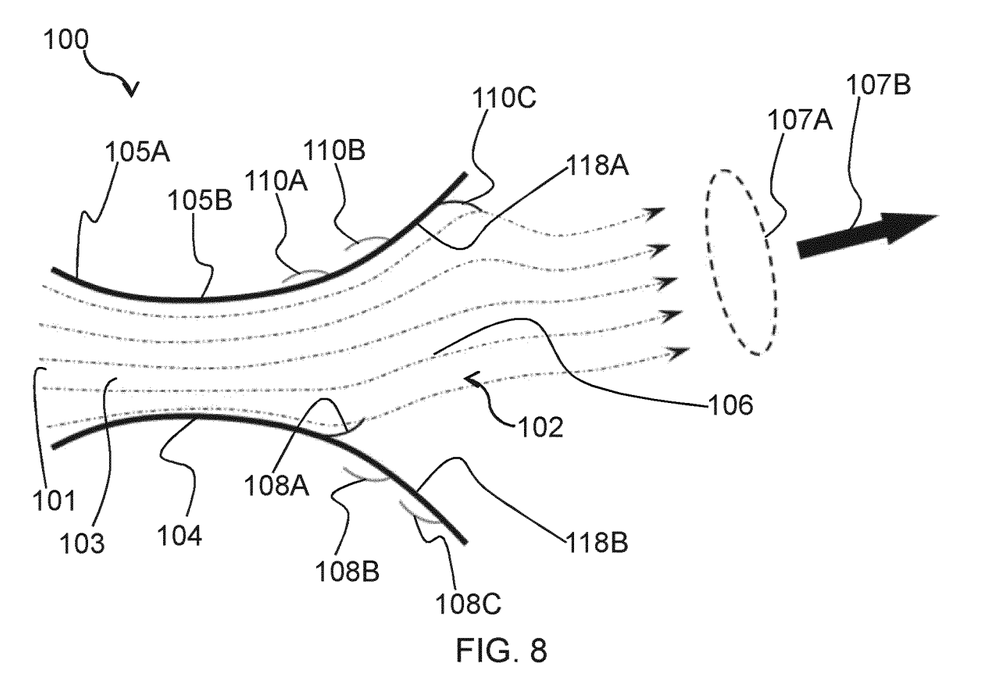
FIG. 8 schematically depicts the apparatus shown in FIG. 1, in which non-opposing air guide members on parts of the wall are protruding into the flared bore.

FIG. 8 schematically depicts the apparatus 100 shown in FIG. 1, in which non-opposing air guide members 108A, 110C on respective opposing parts 118A, 118B of the wall 104 are protruding into the flared bore 106. The resulting airflow pattern 107A is converged, relative to that provided by, for example, the configuration of FIG. 1 in which all of the air guide members 108, 110 are retracted, and that of the configurations shown in FIGS. 2-4 in which only a single air guide member 108, 110 is protruding into the flared bore 106.

Moreover, the protrusion of the non-opposing air guide members 108A, 110C causes the predominant direction of the airflow 107B to be angled or tilted relative to the central axis of the flared bore 106. This contrasts with the symmetrical configurations shown in FIGS. 5-7 in which the predominant direction of the airflow is aligned parallel with the central axis of the flared bore 106, as previously described. Thus, the configuration shown in FIG. 8 may be regarded as providing tilted but converged airflow.

Figure 9:
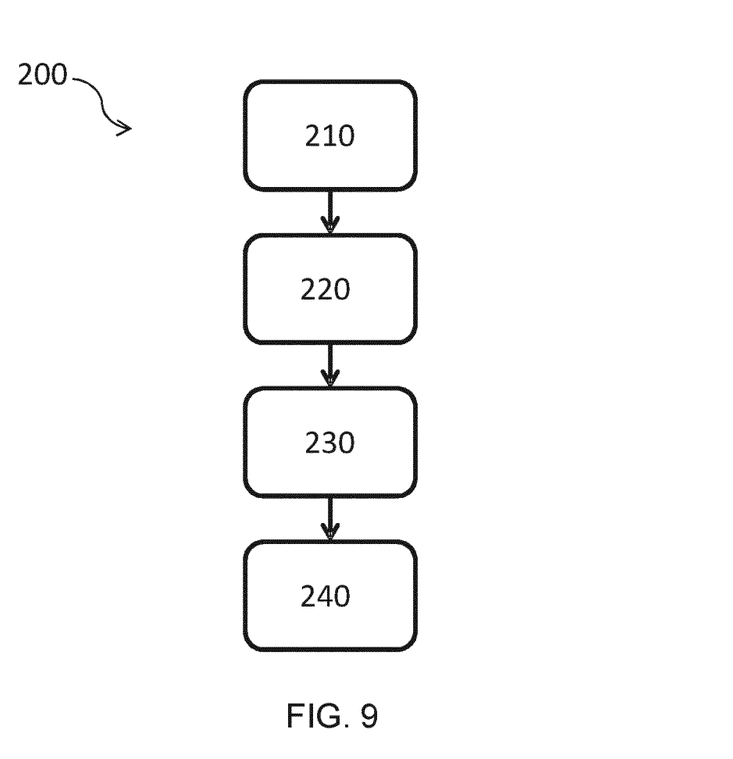
FIG. 9 shows a flowchart of a method according to an example.

FIG. 9 shows a flowchart of a method 200 according to an example. The method 200 involves operating an airflow apparatus having an outlet for allowing air to flow out of the apparatus; a wall delimiting a flared bore which widens to the outlet; and at least one air guide member configured to retractably protrude into the flared bore from the wall, the at least one air guide member having a surface. In other words, the method 200 may, for instance, relate to operation of the airflow apparatus 100 described above in relation to FIGS. 1-8.

The method 200 comprises protruding 230 the at least one air guide member into the flared bore, such that air flowing in the flared bore is guided by the surface away from the wall and towards the outlet.

In an embodiment, the method 200 further comprises retracting 240 the at least one air guide member from the flared bore. The protruding 230 and/or the retracting 240 may, for instance, be implemented in a sequence and/or loop, thereby providing a dynamic airflow from the outlet.

In an embodiment, the at least one air guide member comprises a series of air guide members which are respectively arranged to protrude into the flared bore from positions along the wall which are successively closer to the outlet, as previously described in relation to FIGS. 2-4, and the method 200 comprises selecting 210 at least one of the air guide members of the series based on a desired direction and/or degree of convergence of airflow from the outlet. The protruding 230 may then comprise protruding the selected at least one of the respective air guide members of the series into the flared bore.

Alternatively or additionally, the at least one air guide member comprises a pair of opposing air guide members, as previously described in relation to FIGS. 5-7, and the method 200 comprises selecting 220 one or both of the air guide members of the pair based on a desired direction and/or degree of convergence of airflow from the outlet. The protruding 230 may comprise protruding the selected one or both air guide members of the pair of air guide members into the flared bore.

As shown in the flowchart of FIG. 9, the method 200 may combine the selecting 210 of the at least one of the air guide members of the series with selecting 220 of one or both of the air guide members of the pair. The protruding 230 may thus comprise protruding the selected at least one of the respective air guide members of the series, and protruding the selected one or both air guide members of the pair of air guide members into the flared bore. In this way, the airflow apparatus 100 may be operated such that the various exemplary airflow patterns 107A shown in FIGS. 1-8, among others, can be generated.

Figure 10:
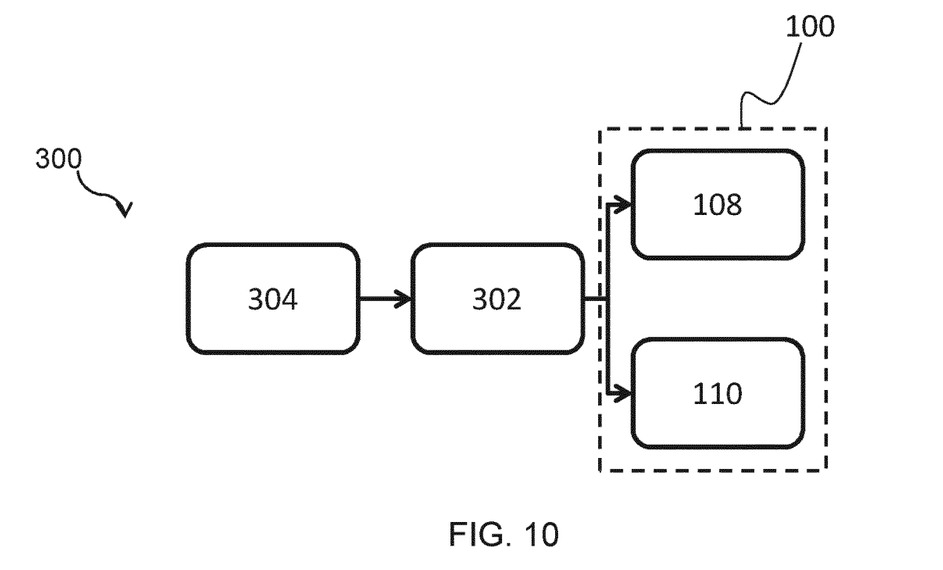
FIG. 10 shows a block diagram of a system according to an example.

FIG. 10 shows a block diagram of a system 300 according to an example. The system 300 comprises the airflow apparatus 100 as defined above, and a controller 302 configured to control the protrusion and/or retraction of the at least one air guide member 108, 110. The arrows between the controller 302 and the air guide members 108, 110 in FIG. 10 represent control signals being sent from the controller 302 to cause protrusion and/or retraction of the air guide members 108, 110 according to the characteristics of the airflow to be generated.

The apparatus 100 may comprise an electrically operated mechanism for protruding and retracting the air guide members 108, 110, and the controller 302 may send control signals to the electrically operated mechanism in order to retract and/or protrude one or more of the air guide members 108, 110 into the flared bore 106.

In a non-limiting example, the electrically operated mechanism may be configured to provide linear motion, e.g. via a rack-and-pinion and linear motor. In such an example, the controller 302 may send a control signal defining the rotation direction of the pinion or the movement direction of the linear motor in order to realize bidirectional motion of the respective air guide member 108, 110 into and out of the flared bore 106. Alternative suitable electrically operated mechanisms will be immediately apparent to the skilled person.

The controller 302 may, for example, be configured to implement the method 200 described above in relation to FIG. 9. For example, the controller 302 may be configured to control the protrusion and/or retraction of the at least one air guide member 108, 110 in a sequence and/or loop, thereby to provide a dynamic airflow from the outlet 102.

The controller 302 may be configured to receive an indication relating to a desired direction, degree of convergence and/or oscillation (e.g. of either or both of the direction and the degree of convergence) of airflow from the outlet 102. The controller 302 may control the protrusion and/or retraction of the at least one air guide member 108, 110 based on the indication.

The system 300 may, for instance, comprise a user interface 304 for permitting user input of the indication. The controller 302 may be configured to receive the indication from the user interface 304, as denoted by the arrow in FIG. 10 between the user interface 304 and the controller 302, and control the protrusion and/or retraction of the at least one air guide member 108, 110 accordingly. Any suitable user interface 304 may be used for this purpose, such as one or more buttons, a dial, a touchscreen, etc.

The user may, for example, be presented with a list of selectable airflow options via the user interface 304. Selection of one or more of the options may result in the controller 302 controlling the air guide member(s) 108, 110, and optionally an air displacement device included in the apparatus 100, in order to provide the desired airflow from the outlet 102.

When the at least one air guide member 108, 110 comprises the series of air guide members described above, the controller 302 may be configured to select one of the air guide members 108, 110 of the series based on the received indication, and control the at least one air guide member such that the selected one of the respective air guide members of the series is protruded into the flared bore 106, as previously described.

Alternatively or additionally, when the at least one air guide member 108, 110 comprises the pair of air guide members described above, the controller 302 may be configured to select one or both of the air guide members from the pair of air guide members based on the received indication, and control the at least one air guide member such that the selected one or both of the air guide members of the pair of air guide members is or are protruded into the flared bore 106.

The system 300 may thus enable generation of various airflow patterns 107A, including focused, dispersed, tilted, oscillating, or any combination of these. Numerous other air guide member 108, 110 arrangements may be contemplated, together with control schemes for controlling the protrusion and/or retraction of the air guide members 108, 110 included in such arrangements.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An airflow apparatus comprising:
    an outlet or allowing air to flow out of the airflow apparatus;
    a wall delimiting a flared bore which widens to the outlet; and
    at least one air guide member configured to retractably protrude into the flared bore from the wall, wherein the at least one air guide member comprises a surface for guiding air flowing in the flared bore away from the wall and towards the outlet when the air guide member is protruding into the flared bore,
    wherein the at least one air guide member comprises a series of air guide members which are respectively arranged to protrude into the flared bore from positions along the wall which are successively closer to the outlet.

2. The airflow apparatus of claim 1, wherein the wall comprises a curved surface whose curvature in a direction of the outlet defines the flared bore.

3. The airflow apparatus of claim 1, wherein the surface of each of the at least one air guide member comprises a concave surface.

4. The airflow apparatus of claim 1, wherein each of the at least one air guide member is retractable through a slot in the wall.

5. The airflow apparatus of claim 1, wherein an extremity of each of the at least one air guide member, when protruding into the flared bore, meets an axis extending between opposing portions of the wall at a distance along the axis from the wall which is less than one third of a width of the flared bore between the opposing portions.

6. The airflow apparatus of claim 1, further comprising an air displacement device configured to provide a flow of air into the flared bore and out of the outlet.

7. The airflow apparatus of claim 1, wherein the at least one air guide member comprises a pair of air guide members which are respectively arranged to protrude into the flared bore from opposing parts of the wall.

8. A method for operating an airflow apparatus of claim 1, comprising:
protruding the at least one air guide member into the flared bore, such that the air flowing in the flared bore is guided by the surface away from the wall and towards the outlet, optionally wherein the method further comprises:
retracting the at least one air guide member from the flared bore.

9. The method of claim 8, further comprising:
selecting at least one of the air guide members of the series based on a desired direction and/or a degree of convergence of airflow from the outlet, wherein the protruding comprises protruding said selected at least one of the respective air guide members of the series into the flared bore.

10. The method of claim 8, further comprising:
selecting one or both of the air guide members of the pair based on a desired direction and/or a degree of convergence of airflow from the outlet, wherein the protruding comprises protruding said selected one or both air guide members of the pair of air guide members into the flared bore.

11. A system comprising:
the airflow apparatus of claim 1; and
a controller configured to control the protrusion and/or the retraction of the at least one air guide member.

12. The system of claim 11, wherein the controller is further configured to receive an indication relating to a desired direction and/or a degree of convergence of the airflow from the outlet, wherein the controller is configured to control the protrusion and/or the retraction of the at least one air guide member based on said indication, wherein the system further comprises a user interface for permitting user input of the indication, and wherein the controller is configured to receive the indication from the user interface.

13. The system of claim 12, wherein the at least one air guide member comprises said series of air guide members, and wherein the controller is further configured to:
select at least one of the air guide members of the series based on the received indication; and
control the at least one air guide member, such that said selected at least one of the respective air guide members of the series is protruded into the flared bore.

14. The system of claim 13, wherein the at least one air guide member comprises said pair of air guide members, and wherein the controller is further configured to:
select one or both of the air guide members from the pair of air guide members based on the received indication; and
control the at least one air guide member, such that said selected one or both of the air guide members of the pair of air guide members is or are protruded into the flared bore.

15. The airflow apparatus of claim 1, wherein by protruding different air guide members of the series into the flared bore, a direction of the airflow is tuned.

16. The airflow apparatus of claim 1, wherein the airflow from the outlet is tuned by combining a selection of one of the air guide members of the series with a selection of one or both of the air guide members of an opposing pair.

* * * * *